(12) United States Patent
Hanafusa et al.

(10) Patent No.: US 8,251,268 B2
(45) Date of Patent: Aug. 28, 2012

(54) CARRIER FOR VEHICLE

(75) Inventors: Seiji Hanafusa, Saitama (JP); Yuji Maki, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1061 days.

(21) Appl. No.: 11/474,467

(22) Filed: Jun. 26, 2006

(65) Prior Publication Data

US 2007/0000960 A1 Jan. 4, 2007

(30) Foreign Application Priority Data

Jun. 30, 2005 (JP) ................................ 2005-193179

(51) Int. Cl.
*B60R 9/00* (2006.01)
*B60R 9/06* (2006.01)

(52) U.S. Cl. ........................................ 224/401; 224/488

(58) Field of Classification Search ............... 224/42.31, 224/42.32, 401, 408, 488, 511, 524, 528, 224/529, 430, 452; D12/107, 407
See application file for complete search history.

(56) References Cited

U.S. PATENT DOCUMENTS

| | | | | | |
|---|---|---|---|---|---|
| 4,277,008 | A | * | 7/1981 | McCleary | 224/401 |
| D289,986 | S | * | 5/1987 | Ooba et al. | D12/107 |
| 4,826,057 | A | * | 5/1989 | Yamada | 224/412 |
| D364,140 | S | * | 11/1995 | Gustavsen | D12/407 |
| D376,344 | S | * | 12/1996 | Gogan et al. | D12/407 |
| D383,095 | S | * | 9/1997 | Miyamoto et al. | D12/107 |
| D415,448 | S | * | 10/1999 | Deutschman | D12/107 |
| D496,308 | S | * | 9/2004 | Wu | D12/107 |
| D520,912 | S | * | 5/2006 | Knight et al. | D12/107 |
| 7,044,526 | B2 | * | 5/2006 | Tweet et al. | 296/3 |
| 7,134,702 | B2 | * | 11/2006 | Takahashi et al. | 296/37.1 |
| D539,705 | S | * | 4/2007 | Ichikawa et al. | D12/107 |
| 7,303,221 | B2 | * | 12/2007 | Takahashi et al. | 296/37.1 |
| 2006/0266777 | A1 | * | 11/2006 | Huang | 224/401 |

FOREIGN PATENT DOCUMENTS

| | | |
|---|---|---|
| JP | S62-299485 A | 12/1987 |
| JP | S64-52888 U | 3/1989 |
| JP | 2003-95165 A | 4/2003 |
| JP | 2003-191768 A | 7/2003 |

* cited by examiner

*Primary Examiner* — Justin Larson
(74) *Attorney, Agent, or Firm* — Birch, Stewart, Kolasch & Birch, LLP (57) ABSTRACT

A front carrier includes an outer frame pipe surrounding the periphery, and a cross pipe and a back-and-forth member which are provided inside the outer frame pipe. A front side portion of the outer frame pipe is lowered at a one-step to form a stepped bottom portion. The back-and-forth member is disposed to extend obliquely downwardly from the cross pipe toward the stepped bottom portion. In addition, the widthwise inside portion of the rear side portion is bent to be forward to form an end side portion, which is joined to the cross pipe to be flush with the back-and-forth member. Thus, a cargo support surface formed by the cross pipe, the back-and-forth member and the end side portion is surrounded by an outer frame portion higher at a one-step than the cargo support. Part of the outer frame portion is allowed to serve as a cargo stopper for the cargo.

8 Claims, 11 Drawing Sheets

CARRIER FOR VEHICLE

CROSS-REFERENCE TO RELATED APPLICATIONS

The present application claims priority under 35 USC 119 to Japanese Patent Application No. 2005-193179 filed on Jun. 30, 2005 the entire contents of which are hereby incorporated by reference.

FIELD OF THE INVENTION

The present invention relates to carriers for vehicles and, more particularly, to a carrier for a vehicle with a simplified and weight-reduced construction.

DESCRIPTION OF BACKGROUND ART

A carrier for a vehicle needs a cargo-stopper to prevent collapse of cargo. Therefore, the cargo-stopper is formed as a separate member to be attached to the front end or the like of the carrier by welding or the like as disclosed in Japanese Patent Laid-Open No. 2003-191768.

Provision of the cargo-stopper as a separate member increases the number of constituent members of the carrier and the manhours for assembly, as well as the weight. Accordingly, it is desired to solve such problems and an object of an embodiment of the present invention is to achieve this result.

OBJECTS AND SUMMARY OF THE INVENTION

In order to solve the above problem, it is an object of an embodiment of the present invention to provide a carrier for a vehicle including an outer frame surrounding periphery with reinforcing members provided inside and connected at ends thereof to the outer frame member so as to constitute a cargo support surface. Part of the outer frame member is bent downwardly to form a stepped bottom portion with one end of the reinforcing member being joined to the stepped bottom portion.

A stepped bottom portion refers to a lower stepped portion among the higher and lower stepped portion.

It is an object of an embodiment of the present invention to provide reinforcing member that slant downwardly to connect with the stepped bottom portion.

It is an object of an embodiment of the present invention to provide the stepped bottom portion to be disposed at the central portion of a vehicle body.

According to an embodiment of the present invention, part of the outer frame member is bent downwardly to form a stepped bottom portion with one end of the reinforcing member being joined to the stepped bottom portion. Therefore, a portion, near the stepped bottom portion, of the cargo support portion formed by the reinforcing member is lower than the outer frame member other than the stepped bottom portion. That is, a portion, of the outer frame member, other than the portion near the stepped bottom portion is higher than the cargo support surface which can then be used as a cargo stopper. Thus, it is not necessary that the cargo stopper is prepared as a separate member and is attached by welding or other processing. As a result, the number of component parts of the carrier and the manhours for assembly can be reduced with a weight reduction being achieved.

According to an embodiment of the present invention, since the reinforcing member is inclined downwardly with one end being joined to the stepped bottom portion, cargo is held on the cargo support surface as an inclined surface so as to move in an inclined direction. Consequently, the cargo placed on the carrier is less likely to move over so as to be held stably.

In addition, the stepped bottom portion and the cargo stopper located higher than the stepped bottom portion are provided near the inclined-directional end of the cargo support surface. Therefore, the stepped bottom portion is adapted to slant the cargo support surface and the cargo stopper can ensure that the cargo is stopped from moving down on the inclined surface.

According to an embodiment of the present invention, the stepped bottom portion is provided on the central side in the widthwise direction. Therefore, it is possible not to interrupt the operator's visibility in the back-and-forth direction and it is possible to load the cargo satisfactorily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment will be described below with reference to the drawings. Note that in the following description, the front and back, left and right, and up and down directions are generally on the basis of a vehicle facing in an operating direction.

Figure 1:
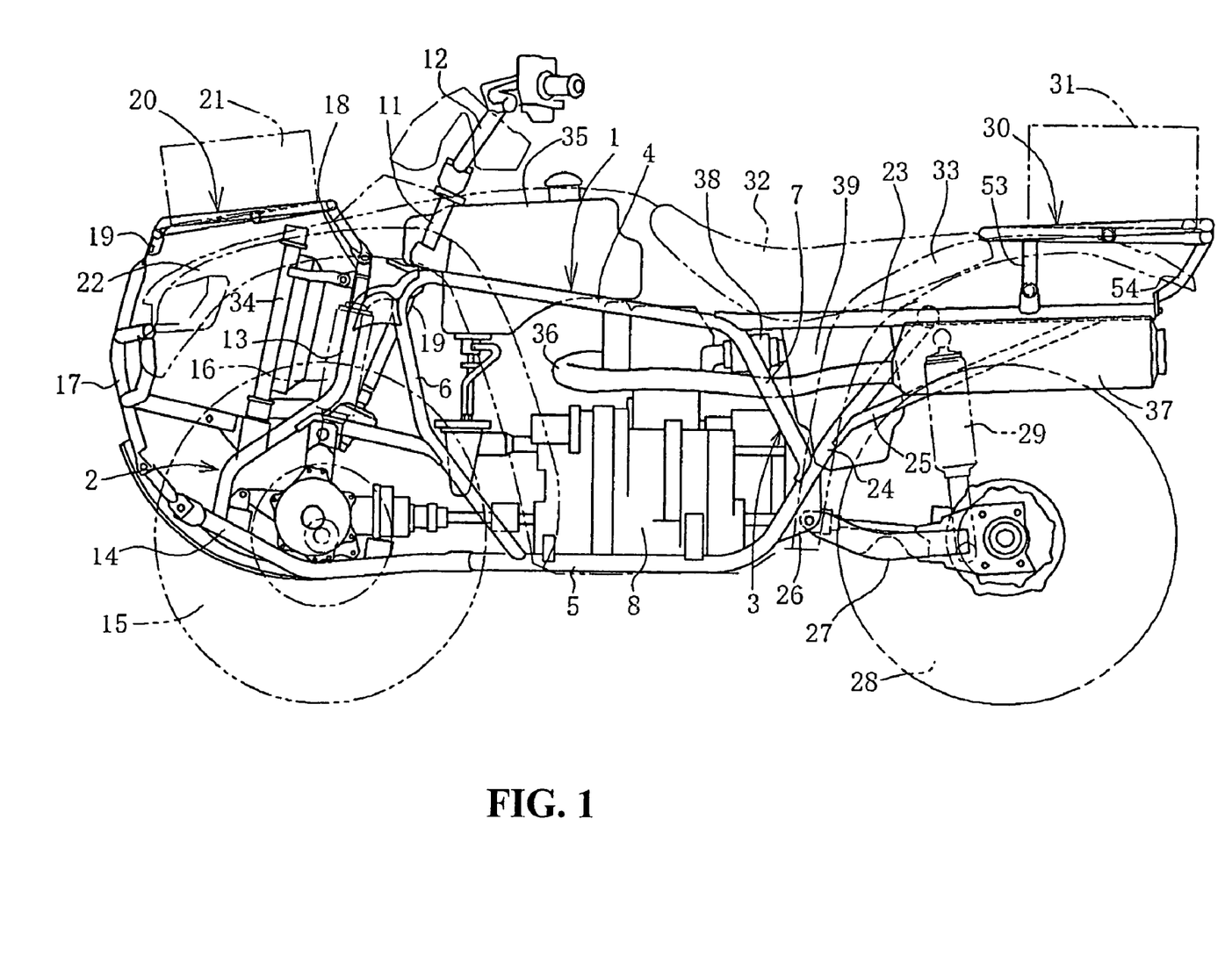
FIG. 1 is a side view of the essential part of a buggy vehicle according to an embodiment.

FIG. 1 is a left side view of a four-wheeled buggy vehicle, mainly depicting a body frame with carriers with a body cover removed. The body frame includes a central loop portion 1 with a front portion 2 provided in front of the loop portion 1 and a rear portion 3 provided in rear of the loop portion 1.

The loop portion 1 includes an upper pipe 4 and a lower pipe 5 which are disposed on an upper side and a lower side, respectively, that extend substantially parallel to each other. In addition, the loop portion 1 includes a front vertical pipe 6 and a rear vertical pipe 7. The front vertical pipe 6 vertically connects the respective front portions of the upper and lower pipes 4, 5. The rear vertical pipe 7 vertically connects the respective rear portions of the upper and lower pipes 4, 5. An engine 8 is mounted inside the loop portion 1. A head pipe 10 that extends vertically is provided in the vicinity of a joint of the front end of the upper pipe 4 and the front vertical pipe 6. A steering shaft 11 is supported for rotation by the head pipe 10 and is turned by a handlebar 12.

The front portion 2 includes a front-down pipe 13, a front lower pipe 14 and the front vertical pipe 6 that form an approximate triangle as viewed from the side. The front-down pipe 13 extends obliquely downwardly and forwardly from a joint of the upper pipe 4 and the front vertical pipe 6. The front lower pipe 14 is connected to the lower end of the front-down pipe 13. The front lower pipe 14 is a front extension of the lower pipe 5. The front portion 2 supports a front wheel 15 via a front suspension with a front shock absorber for the front suspension being provided.

A front bumper 17 that extends vertically is provided forward of the front portion 2 and is connected at its lower end to the front end of the front lower pipe 14. A front carrier 20 is supported between the upper portion of the front bumper 17 and a cross member 18 that spans between the upper portions of the front-down bumpers 13. Although the front carrier 20 slants slightly to above the front fender 22 which covers the front wheels 15 from above, in general it is arranged substantially horizontally. Cargo 21 is held on the front carrier 20 and may be a relatively large, heavy article such as a concrete block or the like.

The rear portion 3 is such that a rear vertical pipe 7, a seat rail 23 and a rear lower pipe 24 form an approximate triangle portion as viewed from the side. The seat rail 23 extends almost-horizontally rearwardly from a joint of the upper pipe 4 and the rear vertical pipe 7. The rear lower pipe 24, which is the rear extension of the lower pipe 5, extends obliquely upward and connects with the middle of the seat rail 23 in a back-and-forth direction. A portion between the rear lower pipe 24 and the seat rail 23 are further reinforced by a rear stay 25.

The rear vertical pipe 7 is joined at its lower end to the vertically middle portion of the rear lower pipe 24. A pivot plate 26 is disposed near the joint and the rear swing arm 27 is connected at its front end to the pivot plate 26. A rear wheel 28 is supported by the rear end of the rear swing arm 27, which is suspended by a rear cushion 29 attached between the seat rail 23 and the rear end of the rear swing arm 27.

A rear carrier 30 is supported by the rear portions of the seat rails 23 with a rear cargo 31 being similar to the cargo 21. The rear carrier 30 is disposed rearwardly of the seat 32 held on the seat rails 23 and above a rear fender 33 covering the rear wheel 28 from above.

In FIG. 1, a radiator 34 is provided together with a fuel tank 35 that is held on the upper pipes 4. An exhaust pipe 36 extends rearwardly from an exhaust port of a cylinder head attached to the engine 8, and connects with a muffler 37 held by the seat rail 23. A carburetor 38 and an air cleaner 39 are provided.

Figure 2:
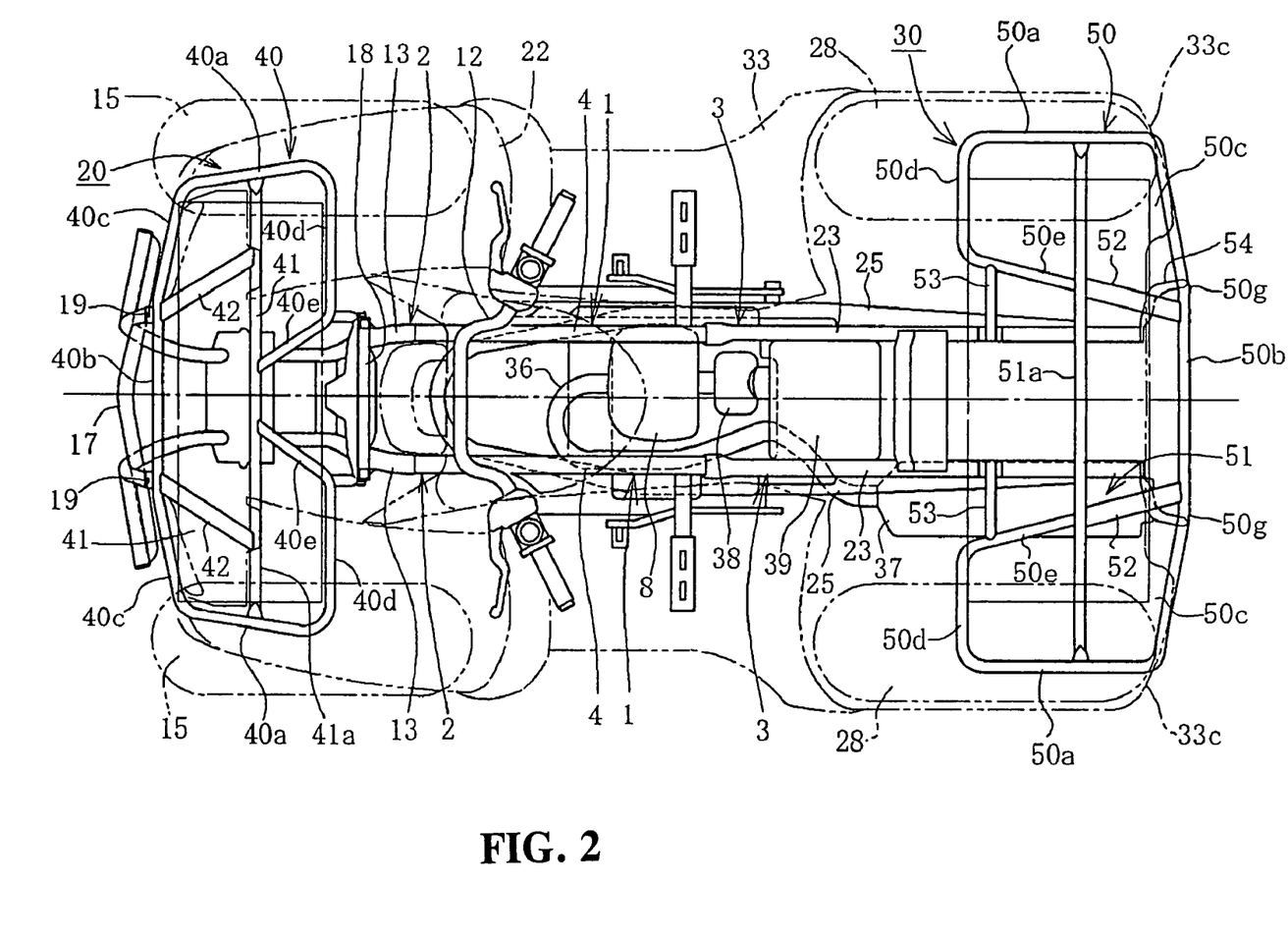
FIG. 2 is a plan view of the essential part of the above-mentioned vehicle.

FIG. 2 is a plan view of a portion similar to that of FIG. 1 with some parts omitted. As illustrated in FIG. 2, a pair of left and right loop portions 1, a pair of left and right front portions 2 and a pair of left and right rear portions 3 are provided. In addition, a pair of left and right front wheels 15 and a pair of left and right rear wheels 28 are provided.

The front carrier 20 is provided to extend symmetrically in a widthwise direction with respect to the body center. In addition, the left and right portions of the front carrier extend to partially overlap the left and right front wheels 15, respectively, above the front fender 22. Likewise, the left and right portions of the rear carrier 30 extend to partially overlap the left and right rear wheels 28, respectively, above the rear fender 33. The rear wheels 28 are covered with the rear fender 33 from above the outside thereof.

The front carrier 20 is composed of an outer frame pipe 40 and reinforcing members 41 disposed inward thereof and serving as a cargo support portion. The reinforcing members 41 include a cross pipe 41a and back-and-forth members 42. The cross pipe 41a connects side portions 40a, 40a, i.e., the left and right portions, of the outer frame pipe 40. The back-and-forth members 42 connect the left and right portions of the cross pipe 41a with the front side portion 40b. The front side portion 40b is formed as a stepped-bottom portion and extends leftward and rightward through oblique line portions 40c, 40c to merge with the side portions 40a, 40a. The rear portions of the side portions 40a, 40a bend toward the body center to form rear side portions 40d, 40d extending parallel to the cross pipe 41a. The widthwise inside portions of the rear side portions 40d, 40d extend to bend obliquely forward, forming end side portions 40e, 40e connecting with the cross pipe 41a.

Figure 3:
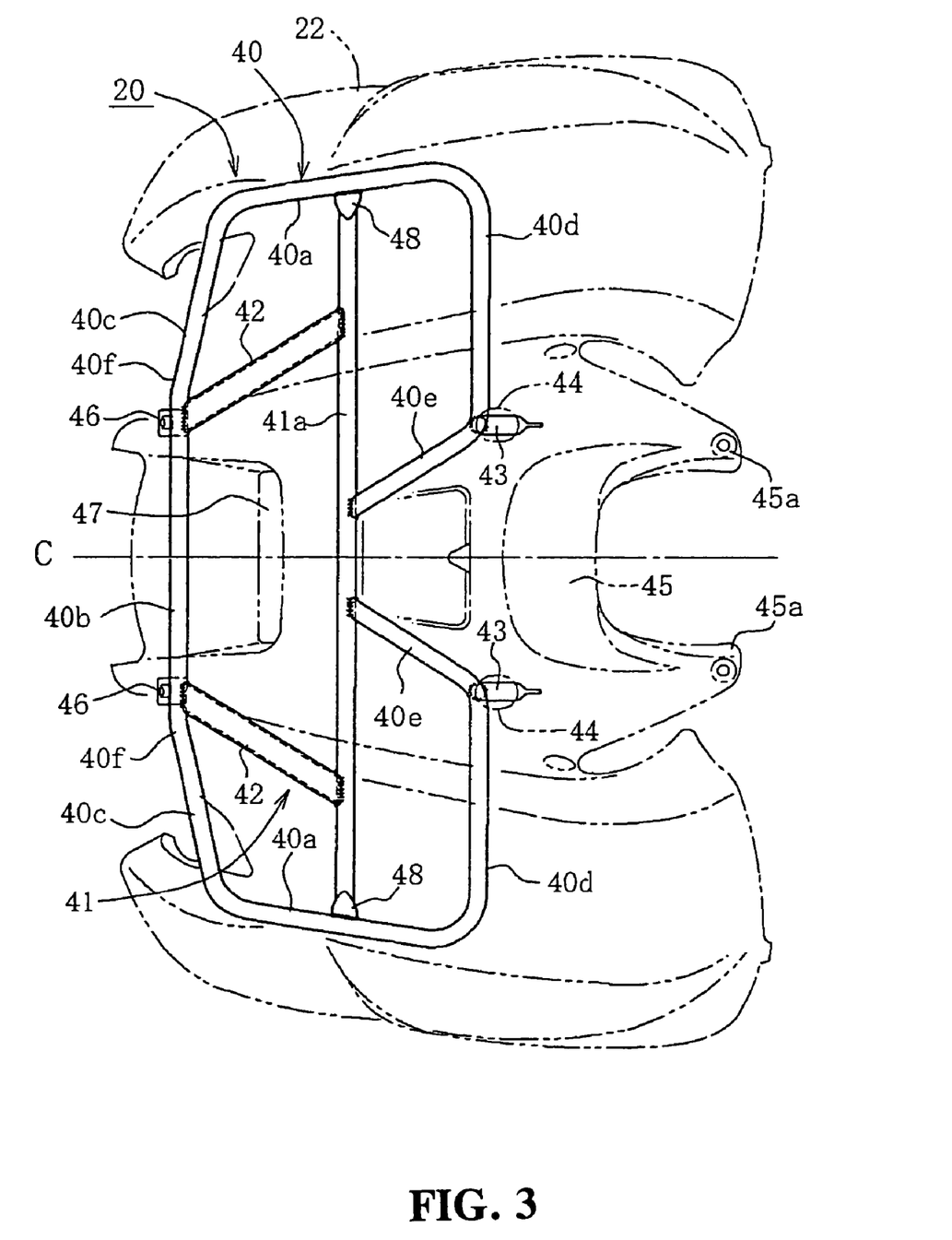
FIG. 3 is a plan view of a front carrier.

Next, the front carrier 20 is further detailed with reference to FIG. 3, which is a plan view of the front carrier together with the front fender 22. The respective rear side portions 40d, 40d extend to the left and the right with respect to the body centerline C. The end side portions 40e, 40e bend forward, extending toward the vicinity of the body center, and is welded to the central portion of the cross pipe 41a.

The respective end side portions 40e, 40e are disposed almost-parallel to the left and right back-and-forth members 42, 42 and on the side of the body center. Stays 43, 43 are welded at its front ends to the vicinity of corners between the left and right rear end portions 40d, 40d and the end side portions 40e, 40e. The stays 43, 43 each project obliquely downward and rearward. The front ends of the stays extend through openings bored in the front fender 22 and are bolted to the cross member 18 (see FIGS. 1 and 2). The stays 43, 43 are located at respective positions corresponding approximately to and forward of the left and right upper ends 45a, 45a of a central protruding portion 45 included in the front fender 22. The front fender 22 surrounds the forward end of the upper end of the steering shaft 11.

The back-and-forth members 42, 42 are disposed symmetrically with respect to the body center so as to slant widthwise-inwardly, that is, to form almost-parallel lines whose width is progressively narrowed as they go forward. In addition, the back-and-forth members are joined at its front ends to the vicinities of oblique line portions 40c, 40c of the front side portion 40b. Stays 46 are attached to respective joint portions between the left and right portions of the front side portion 40b and the back-and-forth members 42, 42 so as to project downwardly. The stays 46 are bolted to flat attachment portions 19 formed at the upper ends of the bumper 17 (see FIGS. 1 and 2). The back-and-forth members 42 each have an almost-U-shape opening downwards in cross-section and a rear end welded to the cross pipe 41a. The front ends of the back-and-forth members 42 are located on both sides or on the left-hand and right-hand sides of an air intake opening 47 for the radiator 34, which is provided at the front center of the front fender 22.

Figure 4:
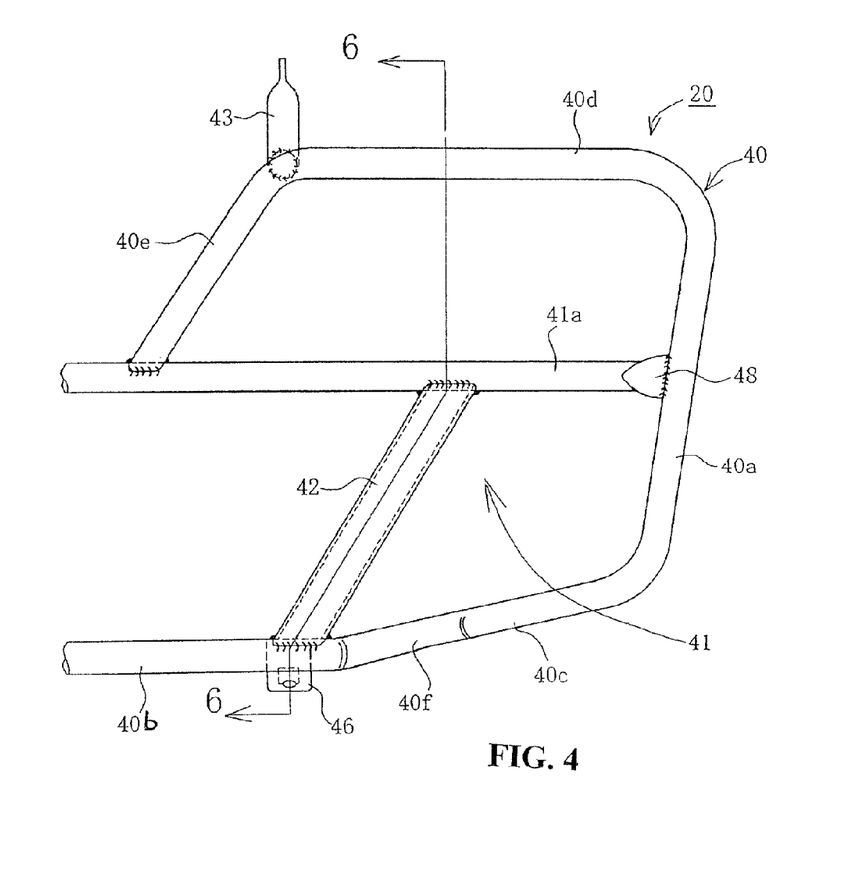
FIG. 4 is an enlarged plan view of the left half of the front carrier.

FIG. 4 is a plan view of the left half of the front carrier 20. The cross pipe 41a has a longitudinal end, i.e., a flat portion 48 having a flat surface on its upper side. This flat portion 48 is welded to a portion corresponding to the middle of the side portion 40a in the back-and-forth direction and to the inside thereof. The back-and-forth member 42 has a flat end surface on its upper side as well.

Figure 5:
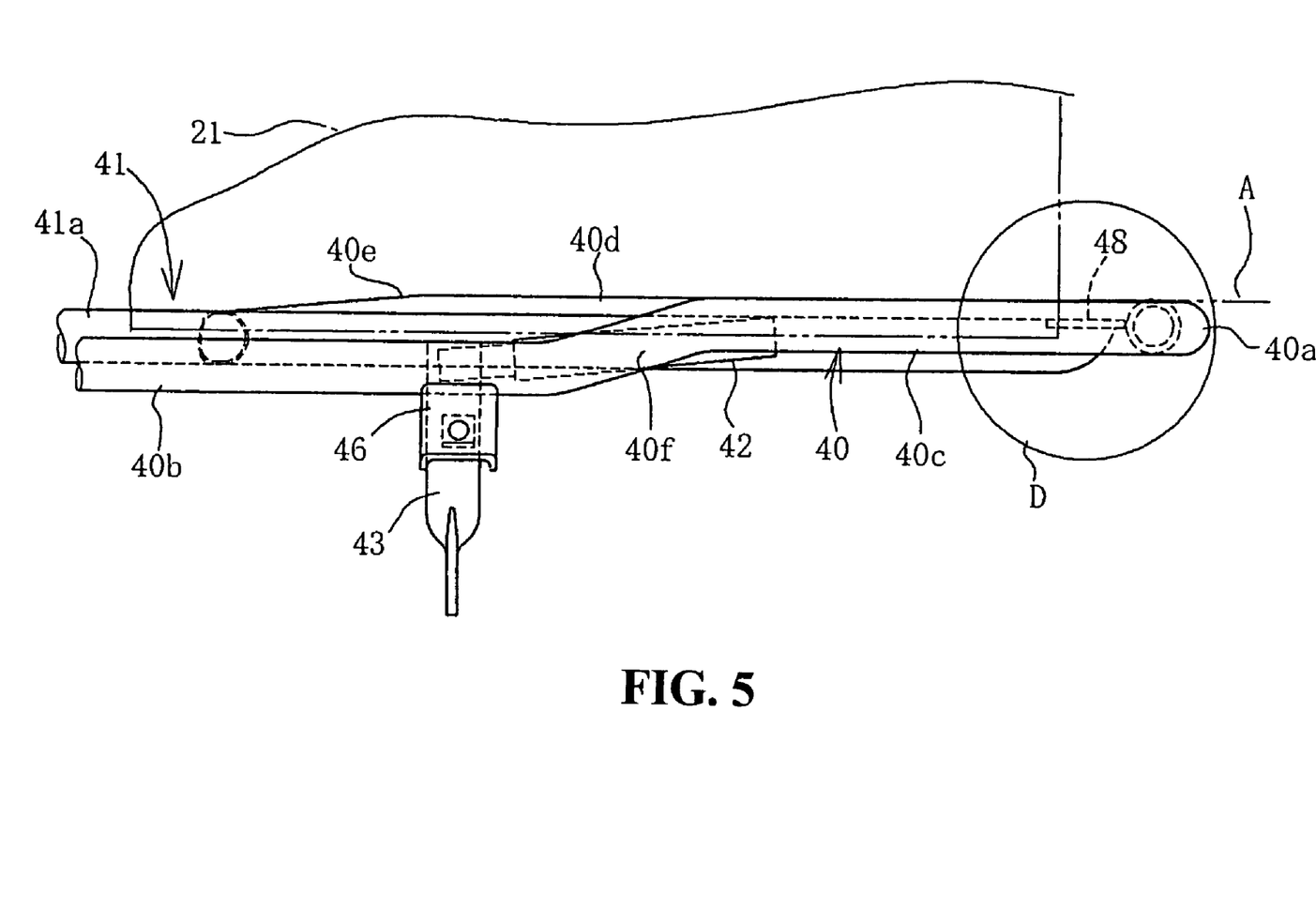
FIG. 5 is a front view of the above-mentioned left half.

FIG. 5 is a front view of a portion corresponding to that of FIG. 4. A portion of the oblique line portion 40c on the body center side bends toward the body center to form a slant portion 40f extending obliquely downwardly and has a lower end merging into the front side portion 40b. Thus, the front side portion 40b is a lowest portion provided at the front body-center portion in the outer frame pipe 40. More specifically, the front side portion 40b is a stepped bottom portion in the present invention.

The slant portion 40c (excluding the slant portion 40f) and the rear side portion 40d overlap each other in the back-and-forth direction. They have outer circumferential surfaces whose top portions have the same height and are the highest portions. Such top portions constitute an outer frame flat surface A. The top portion of the cross pipe 41a is slightly lower than the outer frame flat surface A, but higher than the front side portion 40b. The end side portion 40e has a rear end having the same height as the rear side portion 40d and a front end having the same height as the cross pipe 41a. The front side portion 40b is disposed slightly lower than the cross pipe 41a so as to partially overlap the cross pipe 41a. More specifically, the top of the front side portion 40b is lower than the outer frame flat surface A by a value equal substantially to a pipe-diameter.

Figure 6:
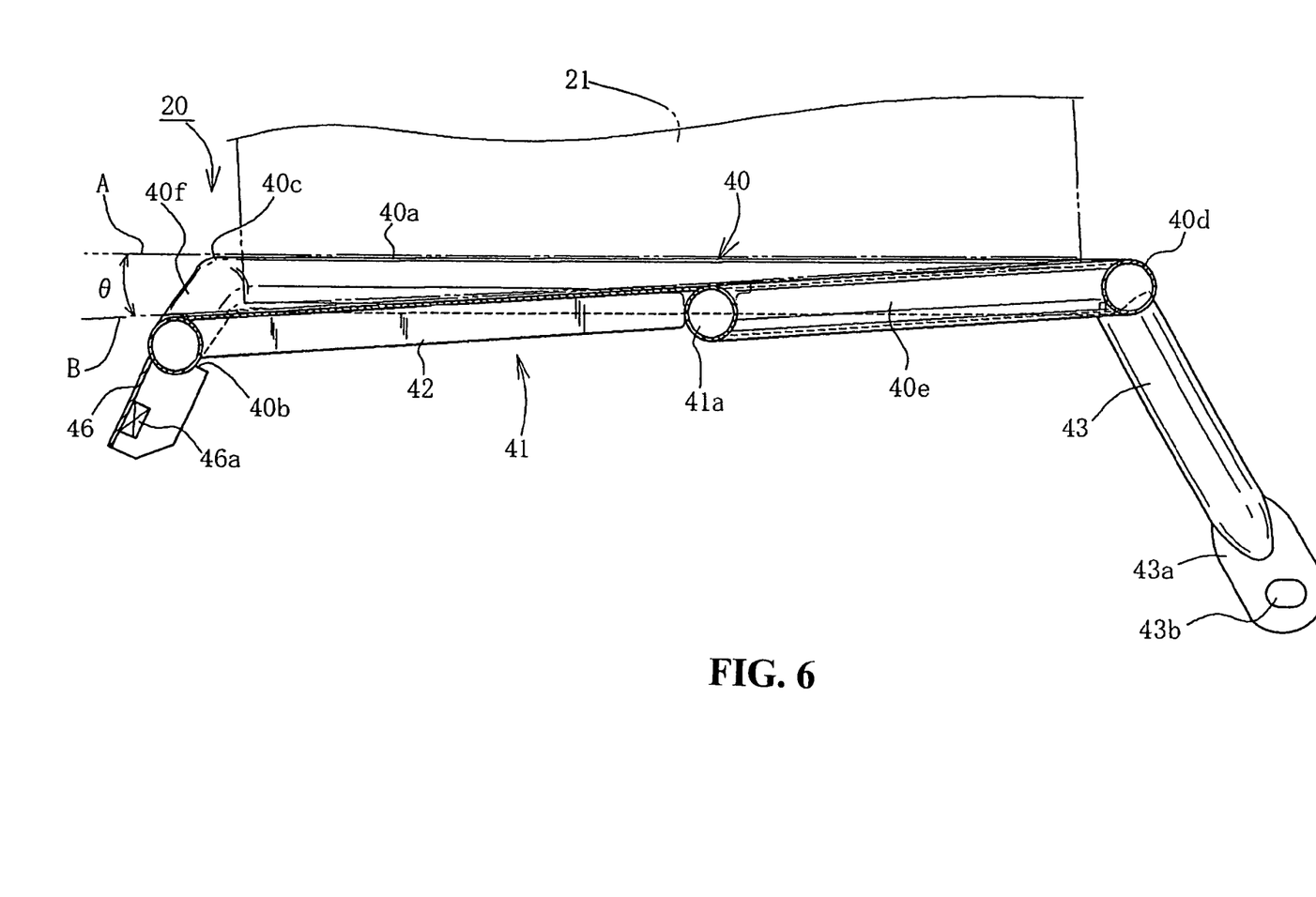
FIG. 6 is a cross-sectional view taken along line 6-6 of FIG. 4.

FIG. 6 is a cross-sectional view taken along line 6-6 of FIG. 4. The upper surfaces of the back-and-forth members 42 and the end side portions 40e and the top of the cross pipe 41a constitute the same cargo support surface B. The plane of the cargo support surface B is a slant surface having a forward slant angle of θ relative to the outer frame flat surface A formed by the top of the side portion 40a or the like. In this example, the cargo support surface B is a single slant surface that continuously extends forward and downward from the front side portion 40b to the rear side portion 40d.

The upper surface of the back-and-forth members 42 and the top of a flat portion 45 continuously constitute the same cargo support surface B, which has a front end flush substantially with the upper surface of the front side portion 40b. A portion, located outside the slant portion 40f, of the respective upper surfaces of the side portion 40a, rear side portion 40d and oblique line portion 40c is positioned inside the same flat surface A. The end side portion 40e slants forwardly from the outer frame flat surface A to the cargo support surface B.

Since a nut 46a is welded to the stay 46, the flat attachment portion 19 (see FIGS. 1 and 2) attached to the upper end of the front bumper 17 can be fastened to the stay 46 with a bolt not shown. The stay 43 is made of a pipe member and has a lower end serving as a flat attachment portion 43a, which is formed with an oval hole 43b. The stay 43 can be fastened to the widthwise end of the cross member 18 (see FIG. 1) with a bolt not shown while accommodating an error with the oval hole 43b.

The cross pipe 41a is connected to the middle portion of the side portion 40a in the back-and-forth direction through the flat portion 48, which has the same height as the top thereof. A broken line that runs along the lower surface of the side portion 40a overlaps the back-and-forth member 42 and the end side portion 40e in FIG. 6. Thus, the broken line passes the center axis of the cross pipe 41a so as to overlap the cross pipe 41a.

Figure 7:
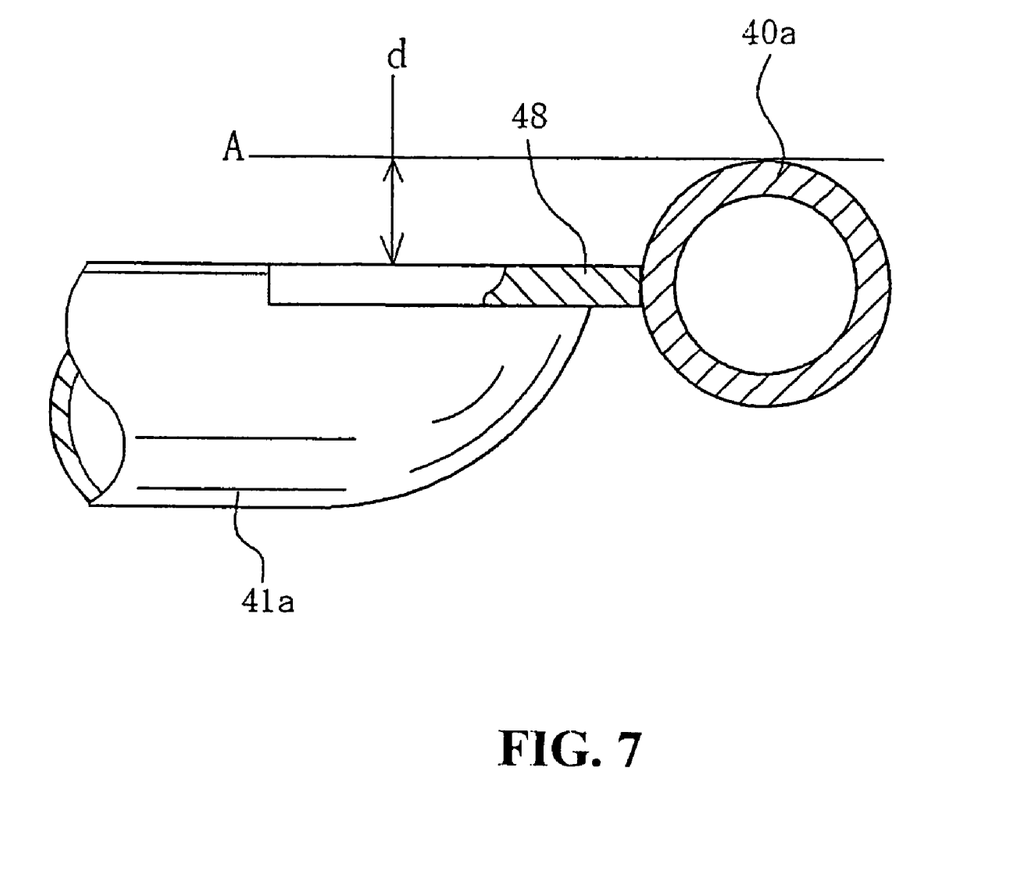
FIG. 7 is an enlarged view of the end portion of a cross pipe.

FIG. 7 is an enlarged view of portion D in FIG. 5. The flat portion 48 is formed in an offset manner to be flush with the top of the cross pipe 41a, and has the top end welded to the heightwise-center of the side of the side portion 40a. Therefore, the top of the cross pipe 41a is lower from the outer frame flat surface A so that it shifts downward by a size "d" equal substantially to half of the diameter of the outer frame pipe 40.

The rear carrier 30 is next described in detail. As shown in FIGS. 2 and 3, the rear carrier 30 is configured to have substantially the same shape as that of the front carrier 20 and be substantially symmetrical with respect to the back-and-forth direction. In addition, the rear carrier 30 includes an outer frame pipe 50 and a reinforcing member 51, which includes a cross pipe 51a and back-and-forth members 52. The cross pipe 51a connects the left and right side portions 50a, 50a of the outer frame pipe 50. The back-and-forth members 52 connect the left and right portions of the cross pipe 51a with the rear side portion 50b of the outer frame pipe 50.

The rear side portion 50b extends to the left and the right to be contiguous to the side portions 50a, 50a through oblique line portions 50c, 50c. Each of the side portions 50a, 50a has a front part which bends toward the body center to form a front side portion 50d, 50d extending parallel to the cross pipe 51a. Each of the front side portions 50d, 50d has a widthwise inside part which bends rearwardly and extends obliquely to form an end side portion 50e, 50e joined to the cross pipe 51a.

The respective front parts of the left and right end side portions 50e, 50e are connected to the left and right seat rails 23, 23 through stays 53, 53, respectively. The seat rails 23, 23 are connected at respective rear ends to the left and right parts of the rear side portion 50b through stays 54, 54.

Taper portions 50c, 50c are obliquely chamfered off to face side rear end portions 33c, 33c formed at the left and right rear ends of the rear fender 33. The side rear end portions 33c, 33c entirely cover up to the rear portions of the rear wheels 28, 28. The taper portions 50c, 50c mostly overlap the side rear end portions 33c, 33c from above. It is however to be noted that the rear side portion 50b projects rearwardly from the rear fender 33 so that it can be used as a ground-contacting portion when the vehicle body is supported in a standing position when stored and as a grip when pulled.

Figure 8:
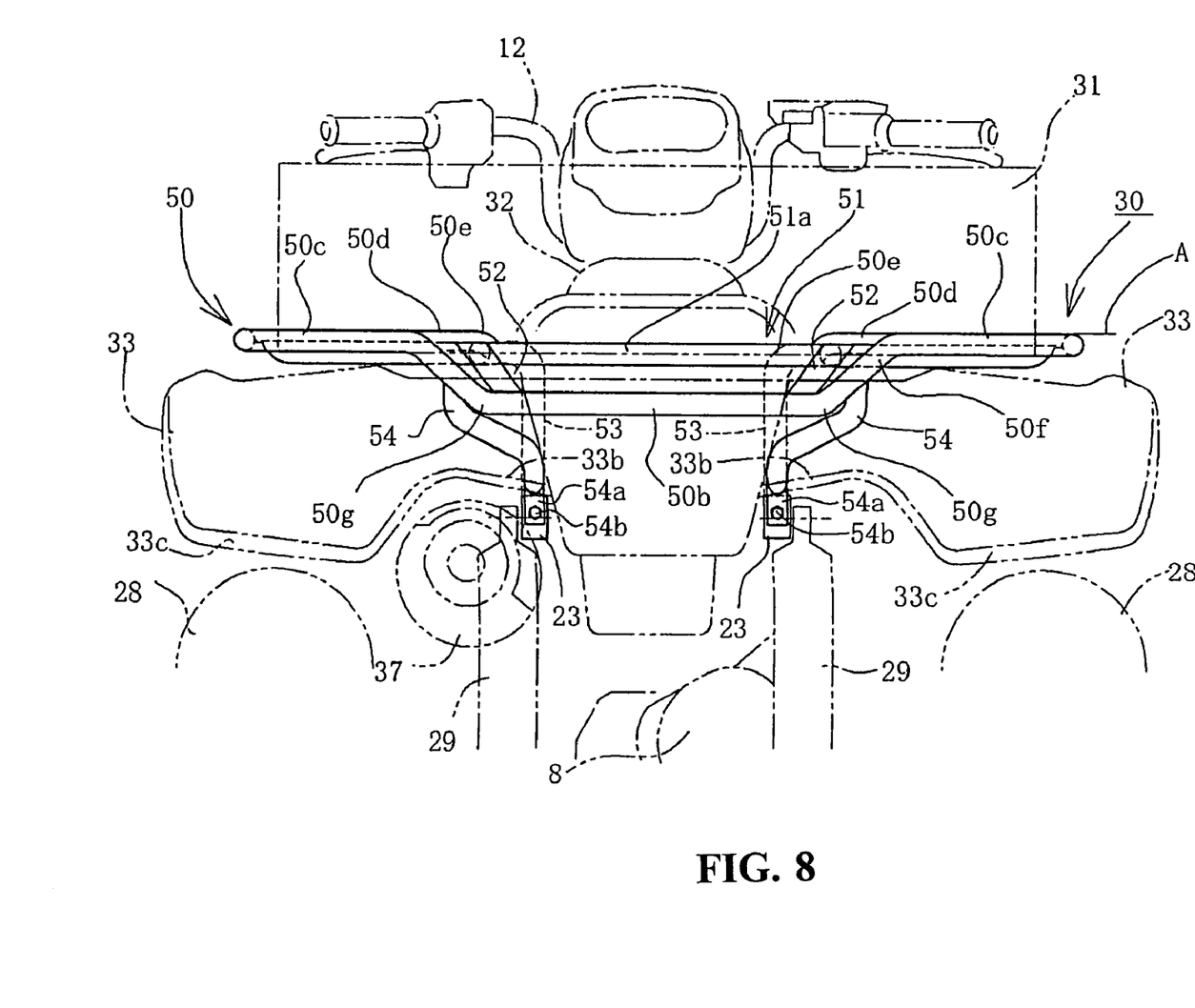
FIG. 8 illustrates a rear carrier as viewed from the rearward of a vehicle body.

FIG. 8 depicts the rear carrier 30 as viewed from the backside of the vehicle body. The widthwise inside portions of the oblique line portions 50c, 50c bend toward the body center to form slant portions 50f, 50f extending obliquely downwardly, and then the lower ends thereof merge into the rear side portion 50b. Thus, the rear side portion 50b is the lowest portion of the outer frame pipe 50 provided at the body center portion, that is the stepped bottom portion in the present invention.

The oblique line portions 50c, 50c (excluding the slant portions 50f, 50f) overlap the front side portions 50d, 50d, respectively, in the back-and-forth direction. The tops of the outer circumferential surfaces thereof are the highest portion and constitute the outer frame flat surface A. The top of the cross pipe 51a is slightly lower than the outer frame flat surface A but higher than the rear side portion 50b. The back-and-forth members 52, 52 each have a front end equal in height to the front side portion 50d and a rear end equal in height to the cross pipe 51a. The rear side portion 50b is slightly offset downwardly from the cross pipe 51a. The top of the rear side portion 50b is slightly lower than the outer frame flat surface A by a value equal approximately to the pipe-diameter.

The left and right end side portions 50e, 50e are joined to the respective tips, bending outwardly, of the stays 53, 53 which extend upwardly from the left and right seat rails 23, 23, respectively. The respective slant portions of the left and right oblique line portions 50c, 50c are joined to the upper ends of the stays 54, 54 extending upwardly from the rear ends of the left and right seat rails 23, 23, respectively. The joint portions are located in the vicinities of bent portions 50g, 50g, of the slant portions 50f, 50f, contiguous to the rear side portion 50b. The longitudinal portions 52, 52 have ends joined to portions on the side of the rear side portion 50b, in the vicinities of the bent portions 50g, 50g and between the rear side portion 50b and the bent portions 50g, 50g.

The stays 54, 54 have lower ends serving as flat attachment portions 54a, 54a and are fastened to the rear ends of the left and right seat rails 23, 23 from the back side of the vehicle body with respective bolts 54b, 54b associated with the attachment portions 54a, 54a. In addition, the structure of the outer frame portion 40 and reinforcing member 41 of the front carrier shown in FIG. 6 is substantially equal to that of the outer frame portion 50 and reinforcing members 51 of the rear carrier 30 if the back and forth are inverted to each other. Therefore, the explanation of these portions is omitted by referring to FIG. 6.

Figure 9:
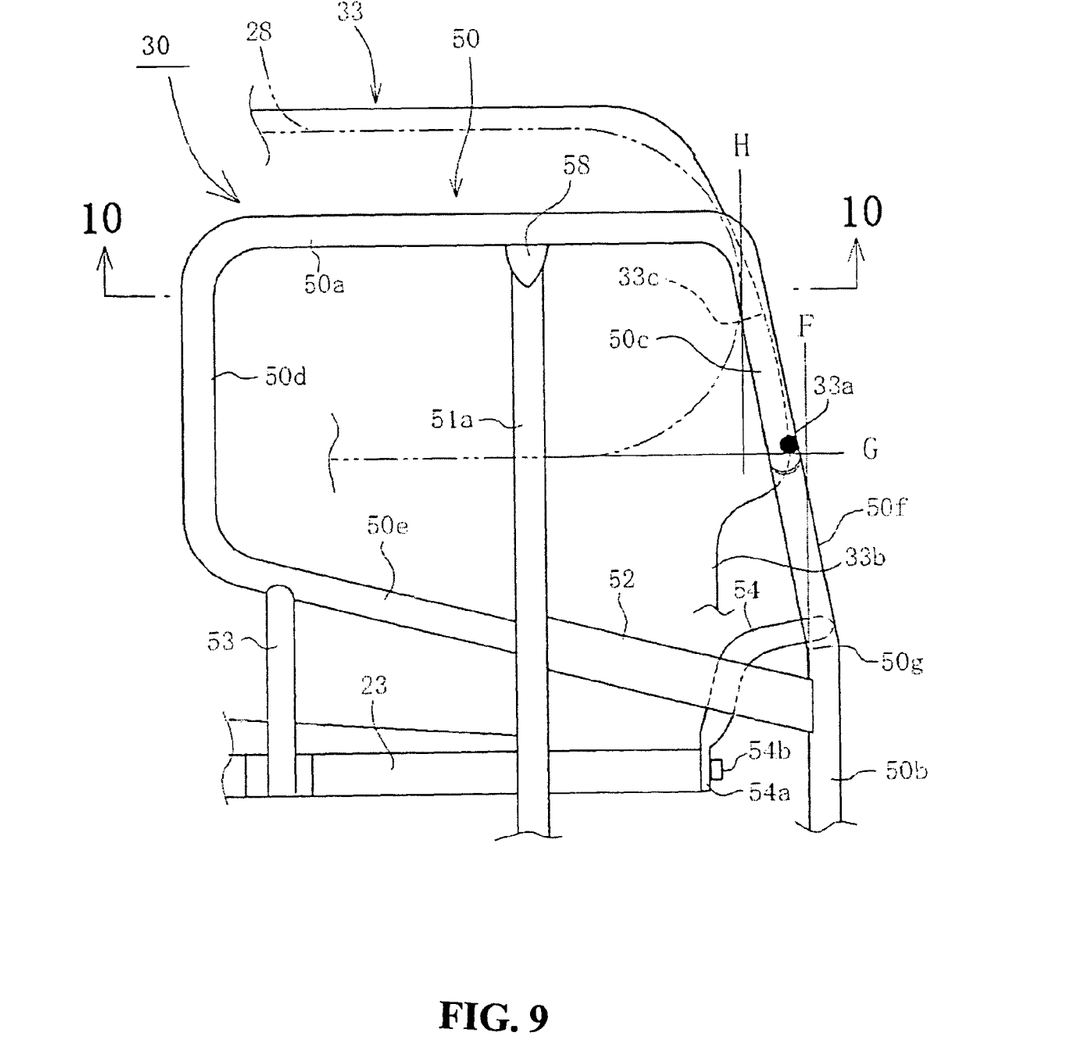
FIG. 9 is an enlarged plan view of the right side portion of a rear vehicle body.

FIG. 9 is an enlarged view of the right-hand portion of the body rear portion in FIG. 2. The side rear end portion 33c includes the rearmost end 33a of the rear fender 33 and an inside portion 33b is provided widthwise inside the side rear end portion 33c. The rearmost end 33a is located forward of the rear side portion 50b and an extended line F extending from the front end of the rear side portion 50b. Symbol H denotes a straight line that extends along the tire rear end of the rear wheel 28 in parallel to the widthwise direction.

Figure 10:
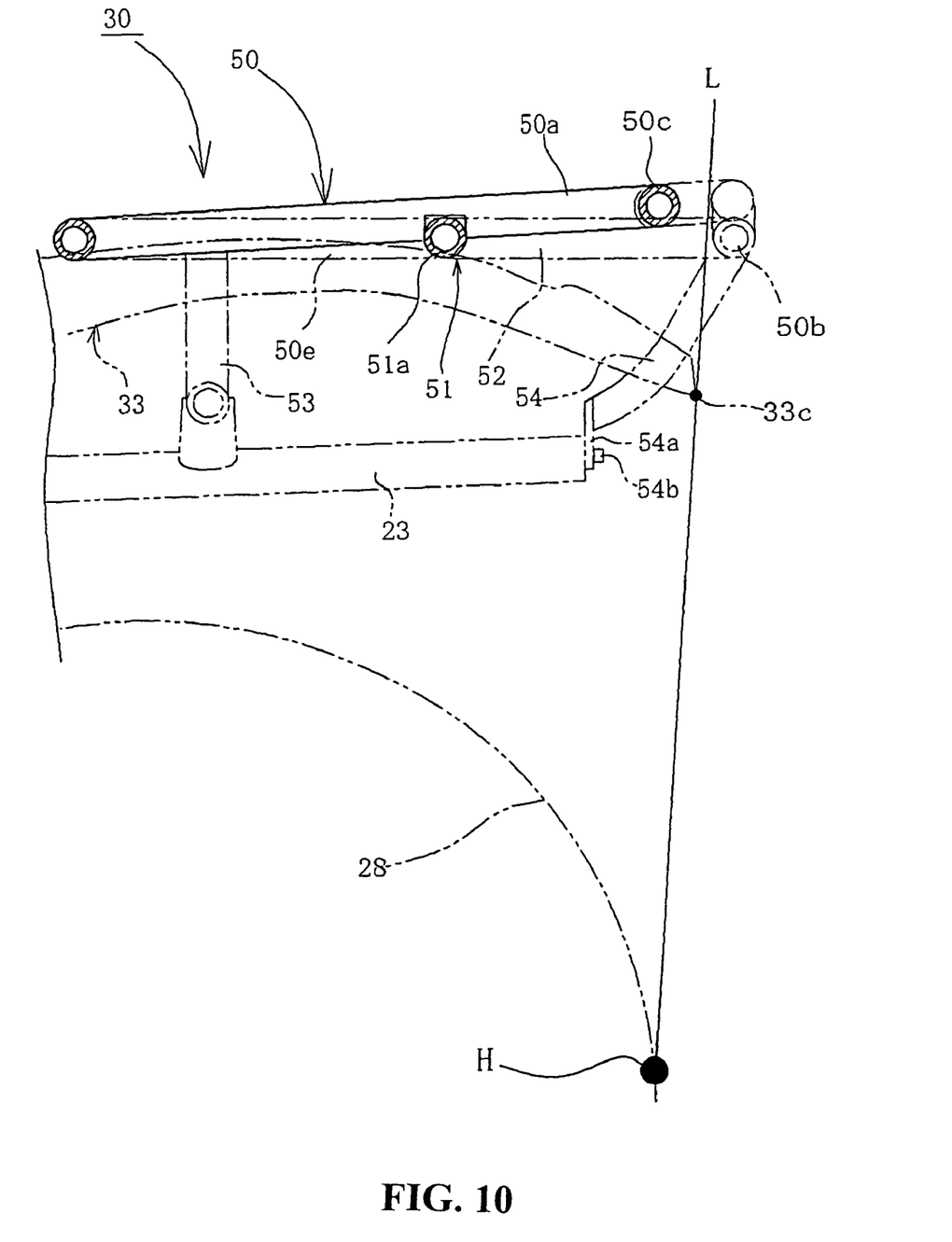
FIG. 10 is a cross-sectional view taken along line 10-10 of FIG. 9.

FIG. 10 is a cross-sectional view taken along line 10-10 of FIG. 9. Assuming that a straight line L connects the side rear end portion 33c of the rear fender 33 and the same portion of the tire of the rear wheel 28 in the widthwise direction, then the taper portion 50c is located forward of the straight line L, on the widthwise outside of the straight line G of FIG. 9. With such an arrangement, it is possible to prevent mud or the like splashed by the tire of the rear wheel 28 from adhering to the taper portion 50c. Note that the straight line H of FIG. 9 is vertical with respect to the sheet surface and is denoted with a point.

Next, the function of the present invention will be described. The cargo support surface B is formed inward of and lower, at a one-step, than the outer frame flat surface A. This flat surface A is composed of the left and right side portions 40a, 40a, the outside portions of the oblique line portions 40c, 40c and the tops of the rear side portions 40d, 40d, of the outer frame pipe 40 which constitutes the contour of the front carrier 20. More specifically, the cargo support surface B includes the cross pipe 41a, the end side portions 40e, 40e, the back-and-forth members 42, 42 and the front side portions 40b, 40b for placing the cargo 21 thereon.

In this way, the cargo 21 is surrounded by the outer frame portion forming the outer frame flat surface A which is higher than the cargo support surface B at a one-step. With respect to the outer frame pipe 40, the side portions 40a, 40a and the oblique line portions 40c, 40c which are higher than the cargo support surface B come into contact with the cargo 21 to serve as a cargo stopper which prevents the cargo 21 from moving over on the cargo support surface B. Thus, the cargo 21 can be held stably and it is not necessary to separately form a cargo stopper.

That is to say, the cargo support surface B and the outer frame flat surface A which are different in height from each other are formed by changing the respective heights of the component parts without forming a different member and welding it. Therefore, the number of component parts and the manhours of assembly can be reduced. Further, a weight saving can be achieved.

In addition, since the cargo support surface B is slanted forward, the cargo 21 can be moved over forward to come into contact with the side of the oblique line portions 40c, 40c serving as the cargo stopper. This reduces the movement of the cargo 21 during traveling to hold the cargo 21 more stably. In addition, the slant cargo support surface B and the cargo stopper can be formed simultaneously since the front portion of the outer frame pipe 40 is made up of the front side portion 40b serving as the step bottom portion and the oblique line portions 40c, 40c serving as the cargo stopper.

Further, the front side portion 40b is formed to bend downwardly, so that the rear end portion 40d becomes relatively higher than the front side portion 40b. The slant face can be formed only by connecting the front side portion 40b with the rear end portion 40d by use of the end side portions 40e, 40e and the back-and-forth members 42, 42. In addition, since the front side portion 40 is provided at the central portion in the widthwise direction, it is possible to lower the body center so as not to interrupt the operator's visibility. In other words, this contributes to ensuring sufficient visibility and makes it possible to load the cargo satisfactorily. The top surfaces of the back-and-forth members 42, 42 and the flat portion 48 of the cross pipe 41a are formed flat. Therefore, it is easy to hold the cargo. Further, since the flat portion 48 is flush with the top of the cross pipe 41a, the middle portion of the cargo support surface B in the back-and-forth direction can be lowered as much as possible.

The rear carrier 30 is configured in the same manner as the front carrier 20 so that the cargo support surface may slant rearwardly (the cargo support surface is formed to slant rearwardly and downwardly in an inverse relation to the cargo support surface B of FIG. 6). Therefore, the rear carrier 30 can exhibit the same effect as the front carrier 20. In addition, the taper portions 50c, 50c overlap the side rear end portions 33c, 33c of the rear fender 33 from above on the widthwise outside of the line G (FIG. 9) widthwise inside of the tire. Therefore, it is possible to prevent mud or the like splashed by the rear wheels 28, 28 from adhering to the taper portions 50c, 50c.

Figure 11:
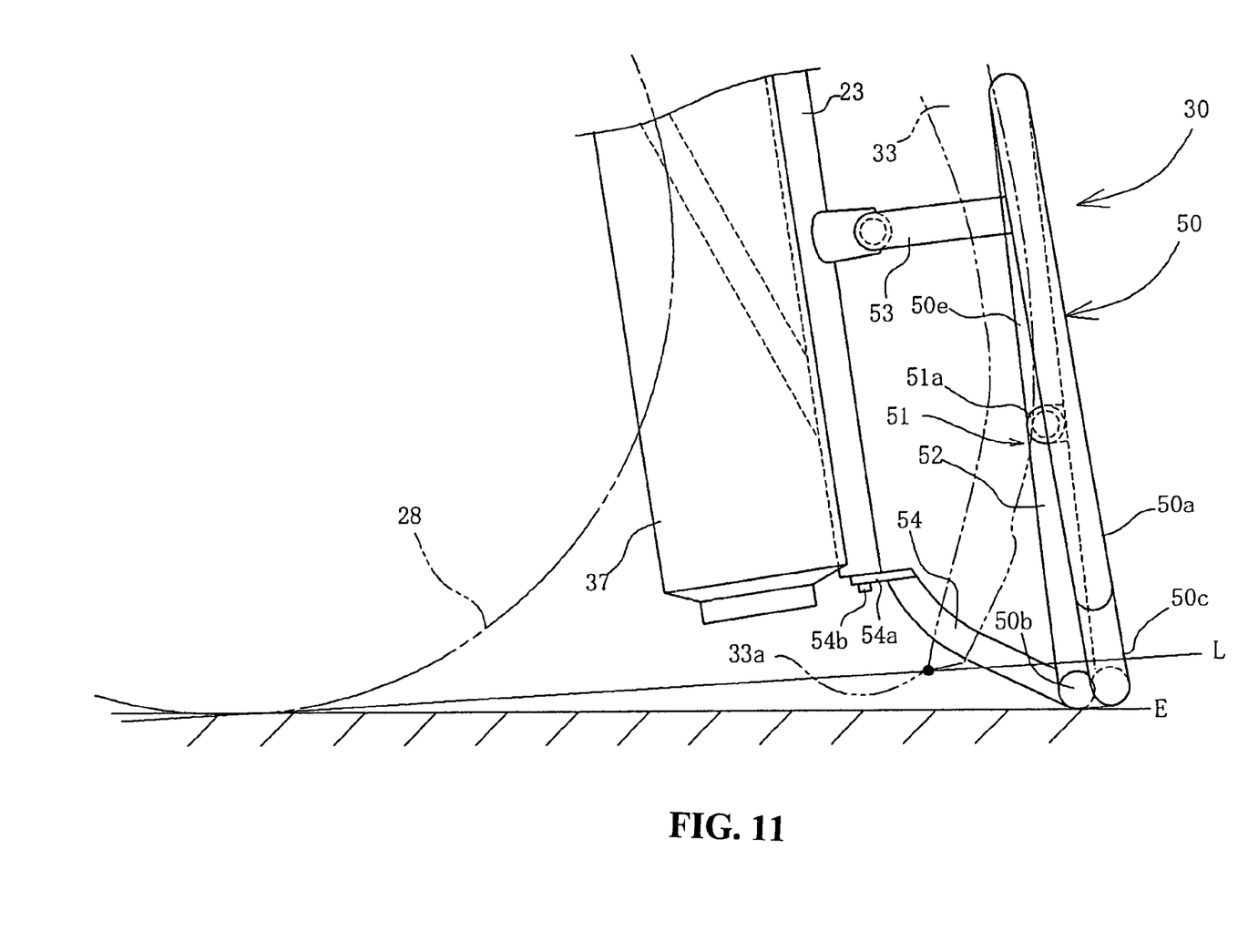
FIG. 11 illustrates the vehicle body in a state of being housed.

When the vehicle body is stored in an upright position, it is possible to prevent the rear end of the rear fender 33 from coming into contact with the ground as illustrated in FIG. 11. As illustrated in FIG. 11, when the vehicle body is stored in an upright position, the left and right rear wheels 28 and the straight rear side portion 50b come into contact with the ground E. At this time, the tangential line L is positioned higher than the rear side portion 50b serving as a ground-contact point. That is, the rear end of the rear fender 33 never projects downwardly from the tangential line L. Therefore, the rear end of the fender 33 can be prevented from coming into contact with the ground, and thereby, from being damaged.

In addition, the present invention is not limited to the above embodiment. Various modifications and applications can be made within the principle of the invention. For example, the carrier structure in which part of the outer frame pipe 40 forms a cargo stopper may be provided in at least one of the front carrier 20 and the rear carrier 30. In addition, the carrier structure may be provided on the left and right sides as well as the front and rear sides in the vehicle body.

The inclined surface serving as the cargo support surface B may be inclined in any direction, longitudinally or laterally. In addition, a plurality of inclined surfaces may be provided in one and the same carrier. In this case, the configuration can be easily obtained by providing a plurality of stepped bottom portions in a plurality of respective locations of the outer frame. Also the stepped bottom portions may be located at any place, a longitudinal or lateral place, of the carrier. If a plurality of stepped bottom portions are disposed at respective locations opposite to each other and straight reinforcing members span between the corresponding stepped bottom portions, the cargo support surface B that is not necessarily inclined can be provided. Furthermore, the vehicle provided with the carrier is not limited to the buggy vehicle and may be a motorcycle or other various vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cargo support carrier provided for a vehicle, said carrier comprising:

an outer frame member formed as a frame protruding in a widthwise direction with respect to a body center as viewed from above to surround a periphery; and a reinforcing member provided inside the outer frame member and connected at an end to the outer frame member to constitute a cargo support surface (B);

wherein the outer frame member includes left and right side portions disposed in the widthwise direction with respect to the body center and extending in a back-and-forth direction, and front and rear side portions extending in the widthwise direction from front and rear of the side portions toward the body center, one of the front and rear side portions is located on a body central portion side to form a stepped-bottom portion lower than the other of the front and rear side portions, the stepped-bottom portion merges with the left and right side portions via oblique line portions which extend obliquely with respect to the body center, one of the front and rear portions of the left and right side portions obliquely bend toward the body center to form the oblique line portions, and part of the oblique line portions are formed as slant portions bending toward the body center, slanting obliquely downwardly and merging with the stepped-bottom portion, the other of the front and rear portions of the left and right side portions bends toward the body center to form the other of the front and rear side portions, the reinforcing member includes a cross pipe connecting the left and right side portions and back-and-forth members slanting forward or rearward from the cross pipe and widthwise inwardly to form almost-parallel lines whose width is progressively narrowed as the back-and-forth members go forward or rearward and joined to the stepped-bottom portion, the back and forth members are joined to vicinities of the oblique line portions of the stepped-bottom portion, and first stays for attachment of the carrier to a vehicle body are attached to such respective joint portions so as to project downward, the other side of the front and rear side portions extend parallel to the cross pipe from left and right the side portions toward the body center, a widthwise inside portion of the other of the front and rear side portion forms a corner portion, bends forward, extends obliquely downward so as to be parallel to the left and right back-and-forth members, and forms an end side portion joined to a horizontal-directional intermediate portion of the cross pipe, and second stays for attachment of the carrier downward from the corresponding vicinities of the corner portions, a single flat surface, taken as an outer frame flat surface (A), is formed of top portions of portions including the left and right side portions and the other sides of the front and rear side portions among the outer frame member, a single flat surface, taken as the cargo support surface (B), is formed of top portions of portions including the stepped-bottom portion, the back-and-forth member, the cross pipe and the end side portion, and the cargo support surface (B) is inclined with respect to and made lower than the outer frame flat surface (A).

2. The cargo support carrier provided for a vehicle, according to claim 1, wherein the carrier is a front carrier attached to a front portion forming a front portion of a body frame, a front bumper is provided forward of the front portion so as to extend vertically and has a connected lower end, and the front carrier is disposed between an upper portion of the front bumper and an upper portion of the front portion, and is supported by the front bumper and the front portion by being attached at front and rear portions to upper portions of the front bumper and of the front portion by means of the first and second stays.

3. The cargo support carrier provided for a vehicle according to claim 1, wherein the rear ends of said back-and-forth members connected to the stepped bottom portion are closer together than the forward ends of the back-and-forth members connected to the cross-member.

4. The cargo support carrier provided for a vehicle according to claim 1, wherein the back-and-forth members are disposed to be substantially symmetrical with respect to a centerline (C) of the outer frame member and are slanted widthwise inwardly.

5. The cargo support carrier provided for a vehicle according to claim 1, wherein the left and right back-and-forth members extend from the left and right side portions of the cross-member to the stepped bottom portion of the outer frame member, and form a plane for the cargo support surface (B) that is at an angle θ relative to an outer frame flat surface.

6. The cargo support provided carrier for a vehicle according to claim 1, wherein the outer frame member is a tubular member and the cross-member is secured to approximately a central portion of said tubular member for forming the cargo support surface that is displaced downwardly relative to left and right side portions of the outer frame member in the widthwise direction.

7. The cargo support carrier provided for a vehicle, according to claim 1, wherein the cross pipe is provided at both widthwise end portions with flat portions each having an upper surface flush with a top portion of the cross pipe, and an end of each of the flat portions is welded to a heightwise central portion of an end face of the side portion so that the top portion of the cross pipe is offset downward from and lower than the outer frame flat surface (A) by a size of approximately half of a pipe diameter of the outer frame pipe.

8. The cargo support carrier provided for a vehicle, according to claim 7, wherein the carrier is a front carrier attached to a front portion forming a front portion of a body frame, a front bumper is provided forward of the front portion so as to extend vertically and has a connected lower end, and the front carrier is disposed between an upper portion of the front bumper and an upper portion of the front portion, and is supported by the front bumper and the front portion by being attached at front and rear portions to upper portions of the front bumper and of the front portion by means of the first and second stays.

* * * * *